(12) United States Patent
Aikin et al.

(10) Patent No.: US 10,300,760 B1
(45) Date of Patent: May 28, 2019

(54) FULLY-ACTUATED SUSPENSION SYSTEM

(71) Applicant: Apple Inc., Cupertino, CA (US)

(72) Inventors: Randol W. Aikin, Sunnyvale, CA (US); Thaddeus Stefanov-Wagner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 15/074,844

(22) Filed: Mar. 18, 2016

Related U.S. Application Data

(60) Provisional application No. 62/135,034, filed on Mar. 18, 2015.

(51) Int. Cl.
*B60G 17/04* (2006.01)
*B60G 15/12* (2006.01)
*B60G 17/08* (2006.01)
*B60G 17/0165* (2006.01)
*B60G 17/016* (2006.01)

(52) U.S. Cl.
CPC ......... *B60G 17/0416* (2013.01); *B60G 15/12* (2013.01); *B60G 17/0164* (2013.01); *B60G 17/0165* (2013.01); *B60G 17/08* (2013.01)

(58) Field of Classification Search
CPC .............. B60G 17/0416; B60G 15/12; B60G 17/0164; B60G 17/0165; B60G 17/08
See application file for complete search history.

(56) References Cited

U.S. PATENT DOCUMENTS

2013/0060423 A1* 3/2013 Jolly ................. B60G 17/0152
701/38
2015/0224845 A1* 8/2015 Anderson ........... B60G 17/019
701/37

* cited by examiner

*Primary Examiner* — Michael D Lang
(74) *Attorney, Agent, or Firm* — Robert C. Kowert; Meyertons, Hood, Kivlin, Kowert & Goetzel, P.C.

(57) ABSTRACT

Some embodiments provide a fully-actuated suspension system which can provide adjustable displacement of a sprung mass from a neutral suspension position over an unsprung mass. The system includes a variable pressure air spring which can adjust the neutral suspension position and execute low-frequency displacements and a hydraulically-driven piston which can execute high-frequency displacements. The system can communicate information to a driver, via haptic feedback provided via actuator displacements, which can augment the driver's situational awareness. The system can provide augmented vehicle braking via displacing the unsprung mass of the vehicle towards the surface upon which the vehicle rests to increase the normal force and contact area of the unsprung mass on the surface, unload torsion of the wheel induced by applied braking pressure to the wheel, etc. The system can compensate for vehicle oscillations at frequencies below the primary ride frequency, thereby mitigating the risk of occupant motion sickness.

20 Claims, 10 Drawing Sheets

FULLY-ACTUATED SUSPENSION SYSTEM

This application claims priority to U.S. Provisional Patent Application Ser. No. 62/135,034, filed Mar. 18, 2015, which is hereby incorporated by reference herein in its entirety.

BACKGROUND

Technical Field

This disclosure relates generally to suspension of a vehicle, and in particular to a fully-actuated suspension system for a vehicle.

Description of the Related Art

Contemporary vehicles, which can include automobiles, delivery trucks, commercial vehicles, etc., can include one or more suspension systems. Such suspension systems, which can include one or more suspension actuators, can support a portion of the vehicle above another portion of the vehicle which contacts a surface upon which the vehicle is navigated, rests, etc. The supported portion of the vehicle is referred to herein as the "sprung mass", and the portion of the vehicle which contacts the surface is referred to herein as the "unsprung mass". A suspension actuator can couple the unsprung mass to the sprung mass, and the actuator can variably support the sprung mass at various heights above the unsprung mass.

In some cases, suspension actuators include one or more springs, dampers, etc. which dampen the effects of variations in height of the unsprung mass upon the height of the sprung mass above the surface. For example, where a vehicle navigates over rough surfaces, the unsprung mass, which can include one or more wheels, can vary in height with the varying height of the rough surface, and a passive suspension system can include dampers, springs, etc. which dampen the transmission of such variation in unsprung mass to the sprung mass, so that the height of the sprung mass does not vary in lockstep with height variations of the unsprung mass.

In some cases, a suspension system includes one or more actuators in place of passive spring and damper systems. Such a suspension system can be referred to as a "fully active suspension" system, a "fully-actuated suspension system", etc. Contemporary fully-actuated suspension systems are often implemented via converting the passive damper into a hydraulic actuator, by replacing the spring and damper system altogether with a hydraulic, mechanical, or electromagnetic actuator, etc.

SUMMARY OF EMBODIMENTS

Some embodiments provide a fully-actuated suspension system. The fully-actuated suspension system includes a suspension actuator, coupled to a sprung mass and an unsprung mass, which adjustably displaces the sprung mass from an adjustable neutral suspension position over the unsprung mass. The suspension actuator includes a variable pressure air spring which adjusts the neutral suspension position based on a particular set of command signals received from a control system and a hydraulically-driven piston assembly configured to be actuated to cause a displacement motion of the actuator from the neutral suspension position based on a separate set of command signals received from the control system.

Some embodiments provide a fully-actuated suspension system, configured to be installed in a vehicle, which includes at least one suspension actuator, coupled to a sprung mass and an unsprung mass; and a control system configured to command the at least one suspension actuator to execute a particular actuation, such that a displacement motion caused by the actuation of the at least one suspension actuator communicates information to at least one occupant of the vehicle.

]Some embodiments provide a fully-actuated suspension system, configured to be installed in a vehicle which comprises a braking system, where the suspension system includes a suspension actuator, coupled to a sprung mass and an unsprung mass, wherein the unsprung mass comprises a wheel assembly coupled to the braking system; and a control system configured to command the suspension actuator to execute a particular actuation, such that a displacement motion caused by the actuation of the at least one suspension actuator causes the wheel assembly to be displaced towards a surface upon which the wheel assembly is located, based on generation of a braking command to the braking system to exert at least some braking pressure on the wheel assembly.

Figure 1:
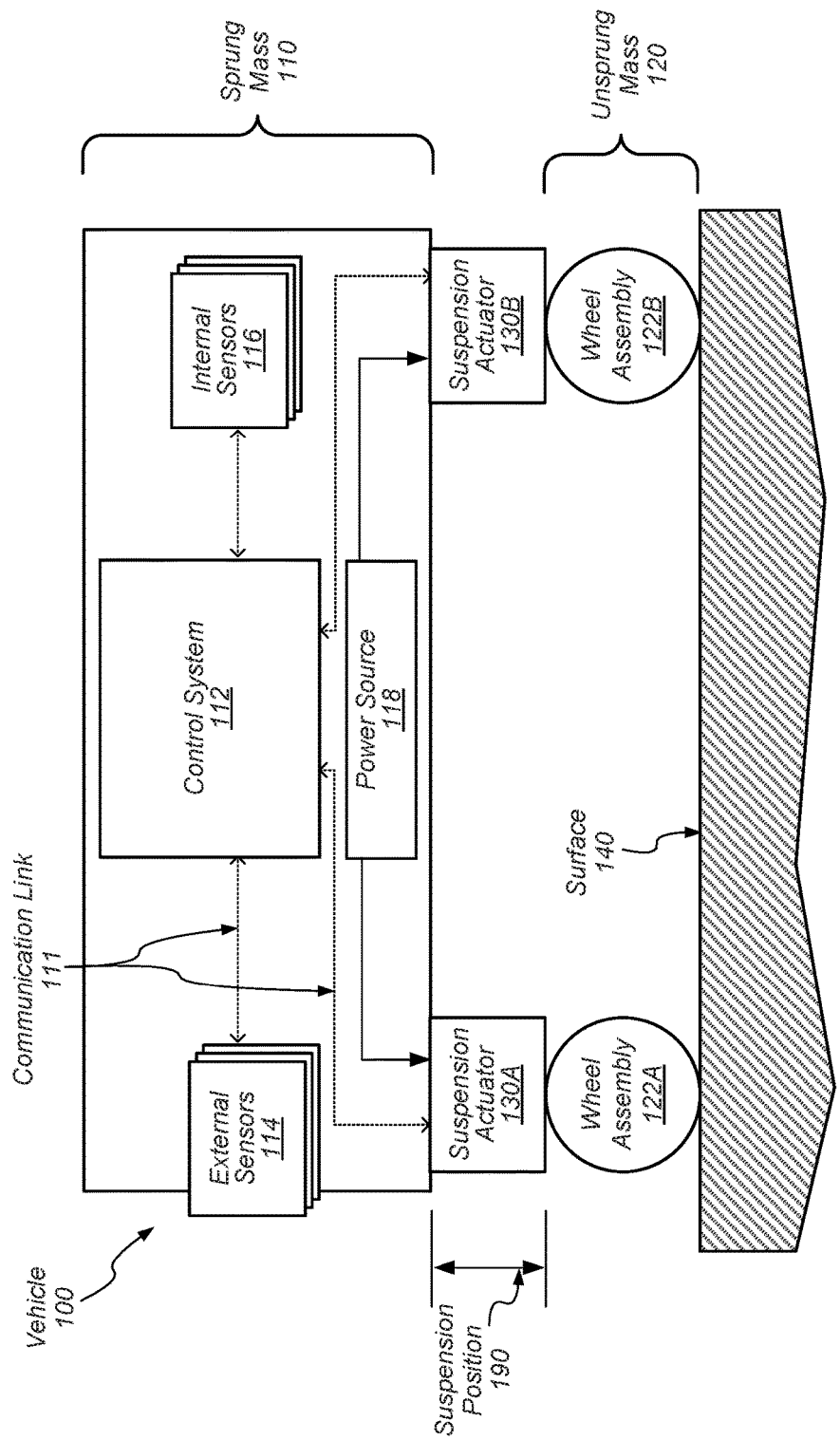
FIG. 1 illustrates a vehicle which includes a fully-actuated suspension system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some embodiments include one or more fully-actuated suspension systems which can be included in one or more vehicles. The fully-actuated suspension system can be configured to implement high-frequency actuation of the suspension of one or more wheels of the vehicle. The fully-actuated suspension system can implement one or more of actuating a variable neutral position of a suspension actuator, implementing actuation of a suspension actuator to communicate information to an occupant of the vehicle, implementing actuation of a suspension actuator to control contact area of a wheel with a surface upon which the wheel rests, implementing actuation of a suspension actuator to augment a braking system of the vehicle, mitigating low-frequency ride oscillations to mitigate a potential cause of motion sickness, some combination thereof, etc.

Suspension Actuator Apparatus

FIG. 1 illustrates a vehicle 100 which includes a fully-actuated suspension system, according to some embodiments. The vehicle shown in FIG. 1 can be included in any of the embodiments herein and can include any of the embodiments of any components of the fully-actuator suspension system included herein.

Vehicle 100 rests on surface 140 and includes an unsprung mass 120 which includes a set of wheel assemblies 112A-B which rest on the surface 140, a set of suspension actuators 130A-B coupled to separate wheel assemblies 112A-B, and a sprung mass which rests on the suspension actuators 130A. The vehicle 100 includes a power source 118 which provides power to at least each of the suspension actuators 130A-B and a control system 112 which is communicatively coupled to the separate actuators 130A-B via one or more communication links 111 and is configured to independently control the various actuators 130A-B. Each separate suspension actuator 130 can be coupled to a separate wheel assembly 122 and can be controlled separately by the control system 112 to actuate the suspension position 190 of at least a portion of the sprung mass 110 over at least one unsprung mass 120 to one or more particular suspension positions. In some embodiments, a fully-actuated suspension system included in vehicle 100 includes at least the suspension actuators 130A-B, the control system 112, and the communication links 11 which communicatively couple system 112 to actuators 130A-B. In some embodiments, the fully-actuated suspension system further includes one or more sets of sensors, including one or more internal sensors 116, one or more external sensors 114, some combination thereof, etc.

In some embodiments, a vehicle includes a separate set of suspension actuators for each separate wheel included in the vehicle, where each separate set of suspension actuators is coupled to a separate wheel. For example, where vehicle 100 includes four wheel assemblies 122 which each include a separate wheel, the fully-actuated suspension system in vehicle 100 can include four separate suspension actuators 130 which are each coupled to a separate wheel assembly 122 are can each be independently controlled by control system 112.

As discussed herein, the control system 112 can control adjustable displacement of the suspension position 190 by the various suspension actuators 130A-B, based on one or more inputs, to generate commands for one or more components included in one or more actuators 130 which results in the various suspension actuators 130A-B inducing one or more various displacements of the suspension positions 190 of the sprung mass 110 over one or more various unsprung masses 120, one or more variations of suspension positions 190 thereof, etc. Different suspension positions 190, variations in suspension position, etc. can be induced by different displacements of components in different suspension actuators 130.

In some embodiments, control system 112 commands one or more suspension actuators 130 to implement one or more particular component displacements based on data received from one or more sensors 114, 116 included in the vehicle 110. Such sensors can include external sensors 114 which are configured to monitor one or more aspects of an exterior environment, including a location sensor, a camera device, a radar device, a light beam scanning device, a microphone device, some combination thereof, etc. Such sensors can include internal sensors 116 which are configured to monitor one or more aspects of the vehicle 100, including wheel spin sensors which monitor wheel spin rates of one or more wheel assemblies 122A-B, accelerometers which monitor acceleration of one or more of the unsprung mass 120 and the sprung mass 110, sensors which monitor a position of one or more components of one or more suspension actuators 130A-B, sensors which monitor navigation of the vehicle 100 along a particular driving route, sensors which monitor one or more of acceleration, velocity, position, etc. of the vehicle 100 along the surface 140, some combination thereof, etc.

In some embodiments, a fully-actuated suspension system includes one or more suspension actuators which each include components including a hydraulically-driven piston and a variable pressure air spring, where the suspension actuator actuates the piston to implement high-frequency control of the suspension position and actuates the variable pressure air spring to implement low-frequency control of the suspension position. Low frequency control can include controlling body motion of the sprung mass and ride height adjustment of the sprung mass, etc. As referred to herein, low-frequency refers to a frequency which is less than the primary ride frequency and high-frequency refers to a frequency which is at least equal to (i.e., greater than or equal to) the primary ride frequency, where the primary ride frequency refers to the natural frequency of the sprung mass.

A suspension actuator which includes a combination of a hydraulically-driven piston and a variable pressure air spring, in some embodiments, enables displacement of the suspension position with significantly reduced power consumption as compared to alternative designs, based at least in part upon the control of the variable pressure air spring to adjust a neutral suspension position of the suspension actuator, where a neutral suspension position, as referred to herein, refers to a suspension position 190 at which negligible power consumption by the suspension actuator is required for the suspension actuator to maintain the suspension position.

Figure 2:
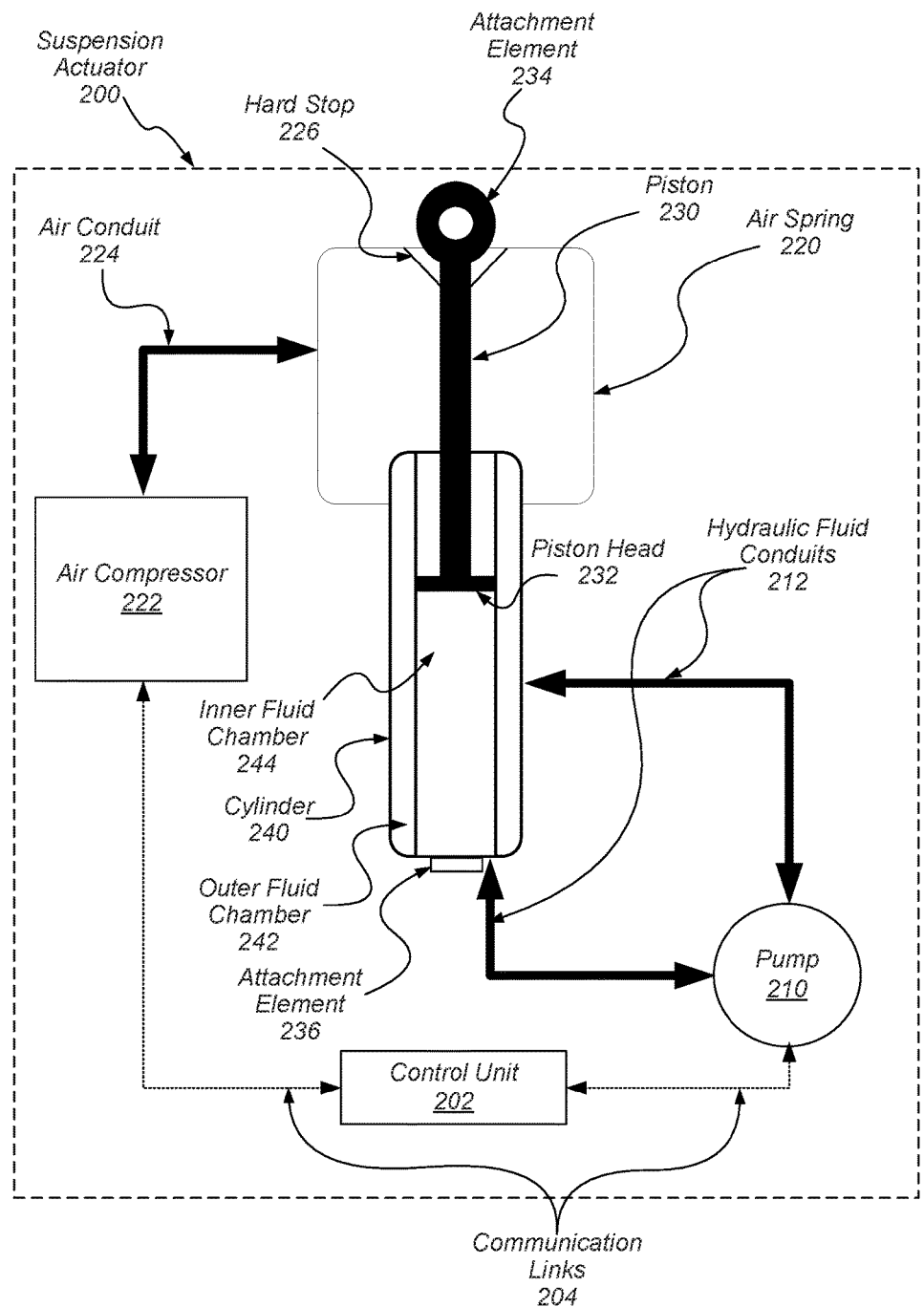
FIG. 2 illustrates a suspension actuator which includes a hydraulically-driven piston and a variable pressure air spring, according to some embodiments.

FIG. 2 illustrates a suspension actuator which includes a hydraulically-driven piston 230 and a variable pressure air spring 220, according to some embodiments. The suspension actuator 200 shown in FIG. 2 can be included in any of the suspension actuators shown and described in the fully-actuated suspension system shown in FIG. 1.

Actuator 200 includes a hydraulically-driven piston 230 which is configured to be adjustably displaced, relative to a cylinder 240, based on hydraulic pressure. The cylinder 240 includes an outer fluid chamber 242 and an inner fluid chamber 244. A hydraulic fluid pump 210 is coupled to the separate chambers 242, 244 via hydraulic fluid conduits 212 via which hydraulic fluid can flow between the chambers 242, 244 and the pump 210. When compressed, the head 232 of the piston 230, which can include a sealed gasket, drives hydraulic fluid between the inner fluid chamber 244 and outer fluid chamber 242. In some embodiments, cylinder 240 includes a single chamber 244 and chamber 242 is absent. In some embodiments, multiple fluid chambers, including three or more chambers, are included within cylinder 240. This may also be achieved with mono-tube or tri-tube damper design. Based on an action of the pump 210, fluid can be added or removed from chamber 244, which can result in adjusting a displacement of the piston 230 with respect to the cylinder 240 via hydraulic pressure on the piston head 232. The piston 230 includes an attachment element 234 at one end of the piston 230 which can be coupled to one structure, and another attachment element 236 at a distal end of the cylinder 240 which can be coupled to a separate structure, where the separate structures are each a separate one of the sprung mass and at least one unsprung mass. As a result, an adjustment of the piston displacement 230, relative to the cylinder 240, can result in adjustment of the suspension position of the sprung mass, coupled to one of elements 234, 236, relative to an unsprung mass coupled to a separate one of elements 234, 236. Maintaining a particular suspension position of the piston 230 which includes a particular displacement of the piston from a neutral suspension position of the piston 230 can require at least some consumption of electrical power by the pump 210.

Actuator 200 includes a variable pressure air spring 220 which is configured to be adjustably expanded and contracted to adjust a displacement of the piston 230 with respect to the cylinder 240, and thus a suspension position of attachment element 234 relative to attachment element 236. As shown in FIG. 2, the piston 230 extends through the center of the air spring 230 and inserts into the cylinder 240. A hard stop 226 included in the top of the piston 230 prevents further damage of the actuator 200 in the event of a failure of the air spring 220, including the spring being compromised such that it cannot contain pressurized air within the spring 220. As a result, the hard stop 226 enables the vehicle in which the actuator 200 is included to be driven safely until the spring 220 is repaired.

The air spring 220 can include a bellows which expands and contracts based on variable air pressure within the bellows, where the expansion of the bellows can be in parallel with the piston so that variable expansion and contraction of the bellows 220 results in variable displacement of the piston 230. As shown, an air compressor 222 is coupled to the air spring 220 via at least one air conduit 224, which can include a high pressure line via which pressurized air can be transferred between the compressor 222 and the spring 220 based on operation of the compressor 222. In some embodiments, the air spring can maintain a particular expanded state, and thus maintain a particular neutral suspension position of the actuator 220, independently of operation of the compressor and electrical power consumption by one or more components of the actuator 200. For example, the air spring 220 can be expanded to a particular level of expansion, which results in adjustment of the neutral suspension position to a particular suspension position and displacement of the piston to a corresponding neutral position, based on introduction of pressurized air into the air spring 220 via operation of the compressor 222. The conduit 224 can include one or more actuated valves which can isolate pressurized air within the spring 220 so that the pressurized air within the spring 220 maintains the particular displacement of the piston by of the air spring 220 without additional pressurized air from the compressor. As a result, operation of the air compressor 222 is not required to maintain the particular level of expansion of the air spring which results in the adjusted neutral suspension position of the actuator, thereby providing power savings relative to actuators which utilize hydraulic actuators, EM actuators, etc. to maintain displacement from a non-adjustable neutral suspension position.

As shown, the compressor 222 and the pump 210 are each communicatively coupled to a control unit 202 via one or more communication links 204, where a communication link can include one or more instances of power transmission lines, network communication cabling, etc. The control unit 202 can be included in the control system 112 shown in FIG. 1. In some embodiments, the control unit 202 of an actuator 200 which is included in an actuator 130 of vehicle 100 is communicatively coupled to the control system shown in the vehicle 100 of FIG. 1 and can control one or more of the pump 210 and the compressor 222 to adjust the suspension position of the actuator 200 based on signals received at unit 202 from the control system shown in FIG. 1.

The pump 210, in some embodiments, is a reversible positive displacement hydraulic pump, which can include a gerotor, lobe pump, flexible impeller pump, some combination thereof, etc. The pump 210 forces fluid between the inner and outer chambers 242, 244, thus forcing actuation of the piston 230. The hydraulic pump 210 is controlled by an electronic control unit (ECU) 202. The ECU, also referred to herein as a control unit 202, can control the pump 210 to control displacement of the piston 230 from a neutral suspension position based on sensor input from various sensors included in a vehicle in which actuator 200 is included, including look-ahead sensors (cameras, radar, LIDAR, etc.), accelerometers, etc. The pump can be controlled via a high-bandwidth control loop, operated at least in part by control unit 202, to minimize motion transmitted to a sprung mass coupled to at least one element 234, 236 of the actuator 200. In some embodiments, control unit 202 is configured to control the pump 210 to adjustably displace the piston 230 based on anticipation of an obstacle which a vehicle in which the actuator 200 is included is approaching, based on sensor data received at control unit 202 from one or more external sensors of the vehicle.

In some embodiments, the air spring 220 is controllably expanded, contracted, etc. by control unit 202 to attenuate low-frequency motion of the sprung mass, which includes motion which is significantly below the primary ride frequency of the sprung mass to which actuator 200 is coupled. Such control includes adjusting the air pressure in the air spring 220 at a rate and frequency which corresponds to the frequency and gain of the low-frequency motion. In certain vehicle maneuvers, including cornering a vehicle, the air springs 220 included in actuators 200 located proximate to different sides of a vehicle (e.g., the driver's and passenger's side) may be differentially expanded, contracted, etc. with pressurized air to counter body roll of the sprung mass. Where the vehicle is in motion at a high velocity, the air spring pressure can be reduced to lower neutral suspension position so that the ride height of the vehicle is reduced, thus reducing the aerodynamic drag of the vehicle. The air pressure in the air spring is controlled via the ECU 202, which adjusts the pressure by commanding an external air compressor 222, connected to the spring 220 by the high pressure line 224.

In some embodiments, an actuator 200 includes one or more various fail safes. Several fail safes are in place in the event of power loss or malfunction of the ECU 202. If the hydraulic pump 210 fails, either through power loss or ECU 202 failure, the pump can be configured to simply act as a passive valve, allowing hydraulic fluid exchange between chambers 242, 244. This is enabled by the pump element within pump 210 being configured to rotate freely when the motor of the pump 210 is not energized. In addition, as noted above, the actuator 200 includes a hard stop 226 which mitigates damage to the actuator 200 which can result from a failure of the spring 220.

In some embodiments, the actuator 200 can include various different configurations. For example, the pump 210 can be mounted directly onto the outer fluid chamber 242, with exchange valves integrated directly onto the inner 244 and outer 242 chamber walls. Similarly, the high pressure line 224 can be integrated into the piston 230 by incorporating a small capillary into the top of the piston 230. In some embodiments, actuator 200 includes separate ECUs 202 coupled to separates one of the compressor 222 and the pump 210. In some embodiments, a vehicle includes a separate ECU in each actuator 200 included in the vehicle. In some embodiments, the vehicle includes an ECU which controls multiple actuators 200 included in the vehicle.

In some embodiments, the actuator 200 provides actuation, referred to herein interchangeably as adjustable displacement, variable displacement, etc. of the suspension position of the sprung mass, with reduced power consumption, relative to an actuator which includes one or more of a hydraulic actuator alone, a damper comprising with a two-way hydraulic pump, some other type of mechanically or electromagnetically driven ("EM") pump, etc. Such actuators can set the neutral suspension position based on the spring constant of a coil spring, the weight of the vehicle, etc., where actuation of the actuator to adjust the suspension position includes compressing or expanding the spring about its neutral position via power consumption. The consequence of this configuration is that the neutral suspension can be nonadjustable, so that power consumption is greatly increased when the actuator is commanded to hold a fixed position that is displaced from the actuator's neutral suspension position. As a result, changing the vehicle ride height, countering body roll in a cornering maneuver, or preventing body pitch during braking all require power output to the actuator (for the duration that the displacement is held).

The actuator 200 can implement high-frequency actuation of the suspension position, via high-frequency actuation of the piston 230, while maintaining a particular ride height adjustment, body roll adjustment, etc. with less power consumption via actuating the air spring and maintaining a particular actuation of the air spring 220 with reduced power consumption.

Figure 3A:
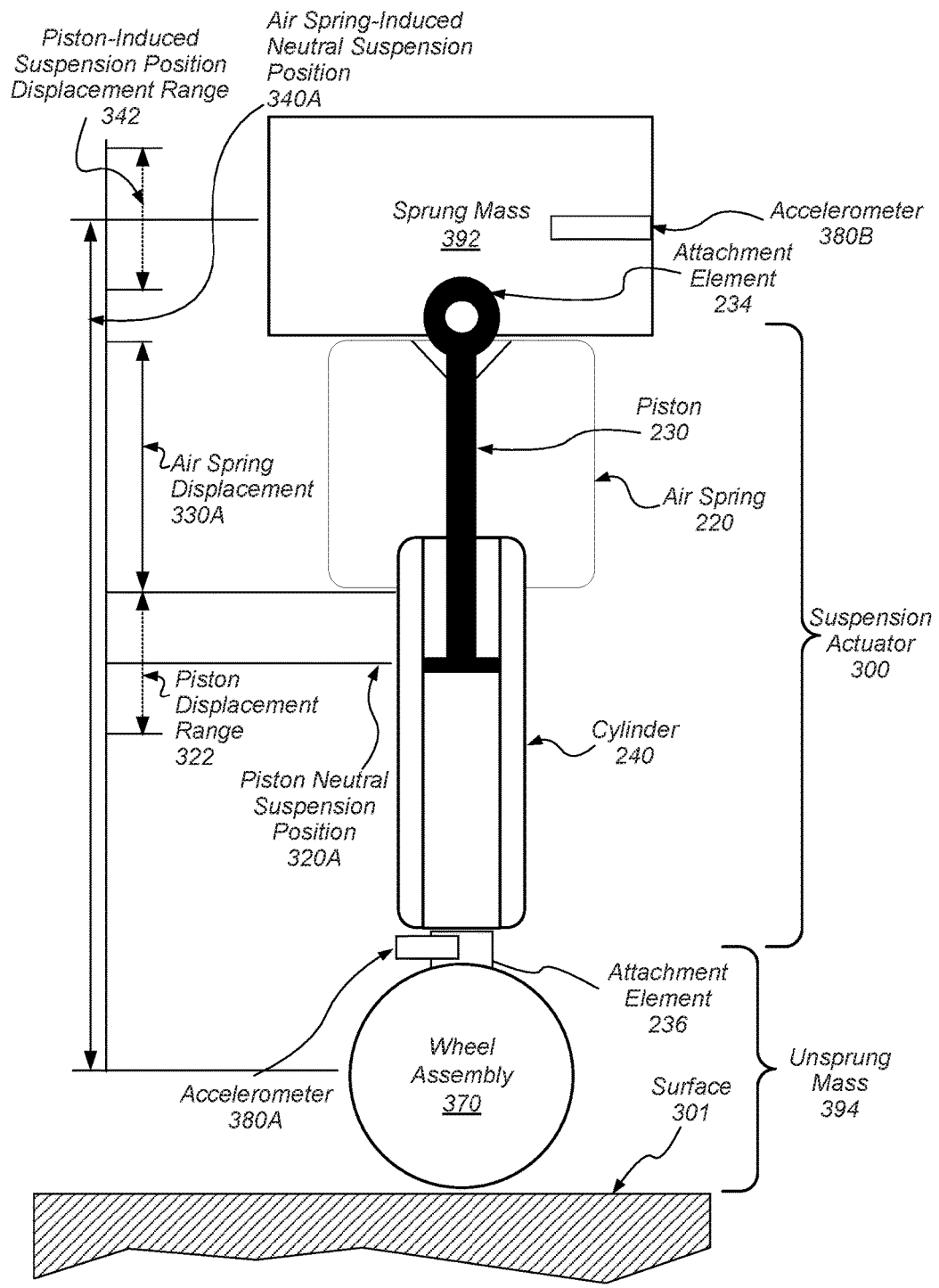
FIG. 3A illustrates a suspension actuator which is suspending a sprung mass over an unsprung mass, which comprises a wheel assembly which rests on a surface, in a neutral suspension position, according to some embodiments.

FIG. 3A illustrates a suspension actuator which is suspending a sprung mass 392 over an unsprung mass 394, which comprises a wheel assembly 370 which rests on a surface 301, in a neutral suspension position, according to some embodiments. The suspension actuator shown in FIG. 3A can be included in any of the embodiments of suspension actuators included herein.

As shown, the sprung mass 392 is suspended above surface 301 at a neutral suspension position 340A which is at least partially induced by the displacement 330A of the air spring 220, which can be implemented via operation of an air compressor, including the air compressor 222 shown in FIG. 2. The air spring 220 can maintain the neutral suspension position 340A of the sprung mass 392 with a reduced amount of electrical power consumption relative to that required by an EM actuator, hydraulic actuator, etc. to maintain the suspension position 340A.

As shown, the piston 230 is held at a neutral suspension position 320A based on the displacement 330A of the air spring 220. The piston 230 can be controlled to be displaced around a range 322, based on operation of a hydraulic pump which causes hydraulic fluid to flow through one or more chambers of cylinder 240. As a result, the piston 230 can be adjustably displaced to adjustably displace the suspension position of the sprung mass 392, relative to the unsprung mass 394, around a range 342. Such adjustment can include maintaining a particular height of the sprung mass over the surface 301, via the air spring actuation 330A, while attenuating high-frequency variations in the unsprung mass 394 height which are greater than or equal to the primary ride frequency, via actuation of the piston 230. In some embodiments, the range 322 is constrained by one or more of the hard stop 226, the dimensions of the cylinder 240, the dimensions of the piston 230, some combination thereof, etc.

Figure 3B:
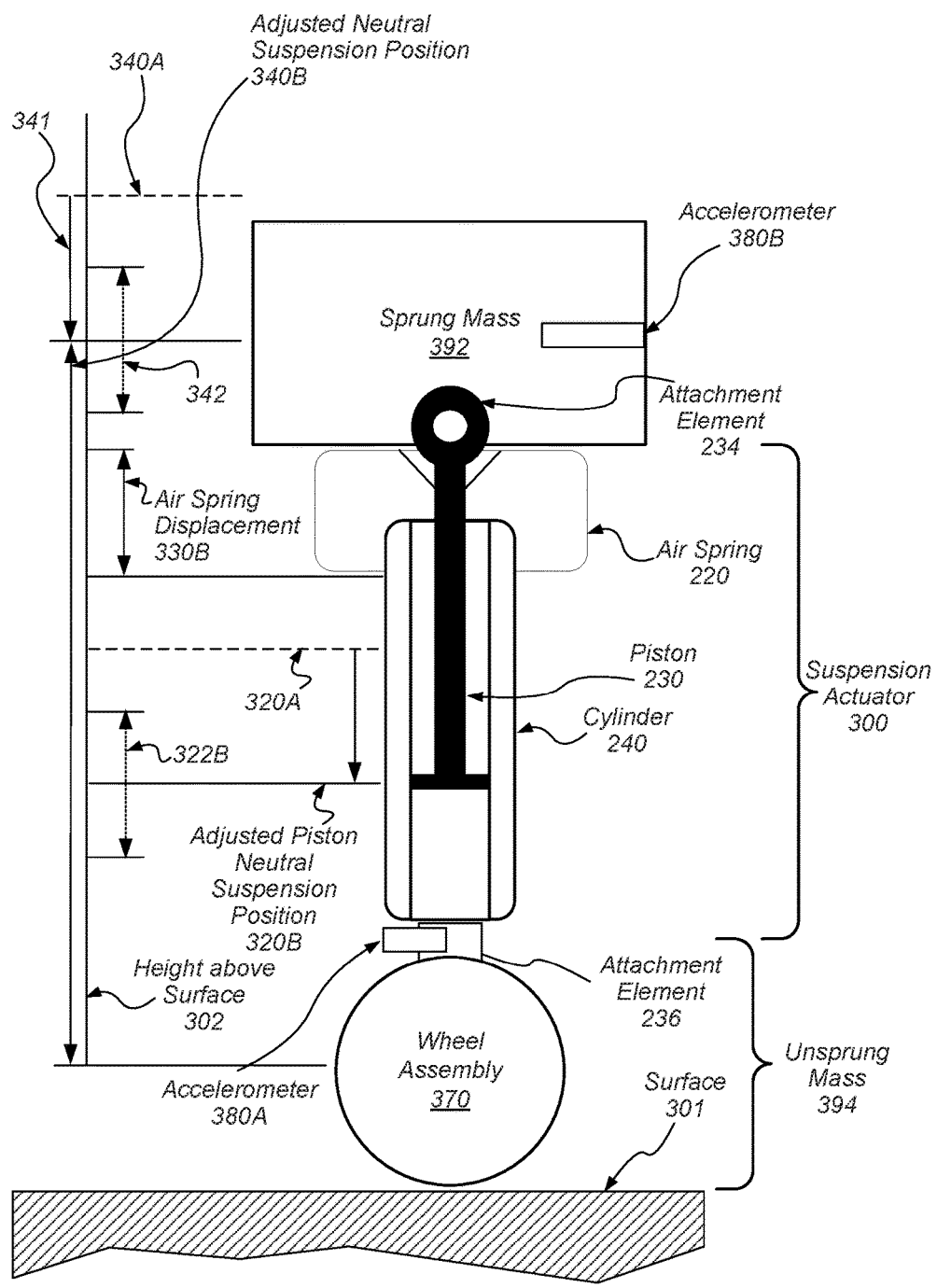
FIG. 3B illustrates a suspension actuator which is suspending a sprung mass over an unsprung mass, which comprises a wheel assembly which rests on a surface, in a neutral suspension position, according to some embodiments.

FIG. 3B illustrates the suspension actuator 300 of FIG. 3A where the air spring 220 is adjusted in displacement 330B to a different displacement 330B which is less than the displacement 330A shown in FIG. 3A, such that the neutral suspension position of the sprung mass 392 is adjusted 341 from position 340A to a different position 340B as a result of the adjusted displacement of the air spring 220. The neutral suspension position of the piston 230 is similarly adjusted to position 320B as a result of the adjustment of the air spring displacement 330B, and actuation of piston 230 around range 322B results in the actuator 300 adjusting, also referred to herein as "displacing", the suspension position of sprung mass 392 around range 342 from the adjusted neutral suspension position 340B.

As shown by FIG. 3A-B, the neutral suspension position 340 of the sprung mass can be adjusted by the air spring 220 of the actuator 200, which can result in adjusting the ride height of the sprung mass, attenuating low-frequency oscillations in the sprung mass, etc., while the piston can be actuated to attenuate high-frequency oscillations in the sprung mass. Because the neutral suspension position can be adjusted via the air spring, and further because maintaining a suspension position via operation of the air spring can require less electrical power than maintaining the suspension position via operation of a hydraulic actuator, EM actuator, etc., the air spring 220 can be actuated to set the neutral suspension position 340 at a position which minimizes the actuations by the piston 230 required to attenuate high-frequency oscillations, which can result in reduction of the power consumption by the actuator 200 in maintaining ride height, attenuating low-frequency oscillations from the primary ride frequency, attenuating high-frequency oscillations from the primary ride frequency, etc.

As shown in FIG. 3A-B, an accelerometer 380A can be coupled to the unsprung mass 394, a portion of the actuator 300 which is coupled to the unsprung mass 394, etc. In addition, an accelerometer 380B can be coupled to the sprung mass 392, a portion of the actuator 300 which is coupled to the sprung mass 392, etc. Acceleration data generated by the accelerometers can be transmitted to one or more control units, including the EMU 202 shown in FIG. 2, the control system shown in FIG. 1, some combination thereof, etc. The accelerometers can be configured to provide the generated data via a high-bandwidth data link connection to the one or more control units. As a result, a control unit which receives high-bandwidth data from the accelerometers 380A-B can determine oscillations of the sprung mass 392 relative to the unsprung mass 394 and can further control the piston 230 to implement actuations 322 to attenuate such oscillations of the sprung mass 392. Such control can be implemented by a control unit via generating command signals to one or more hydraulic pumps included in the actuator 300 and coupled to cylinder 340.

Haptic Feedback

In some embodiments, a fully-actuated suspension system included in a vehicle provides haptic feedback, also referred to herein as kinesthetic communication, to one or more occupants of the vehicle, including a driver of the vehicle, based on particular actuations of one or more suspension actuators included in the fully-actuated suspension system. Such communication can include communicating information regarding one or more aspects of the external environment through which the vehicle is being navigated, communicating information regarding one or more traffic participants located in the external environment, communicating information regarding navigation of the vehicle along a driving route through the external environment, communicating information regarding a state of the vehicle, some combination thereof, etc. In some embodiments, one or more of the suspension actuators in the fully-actuated suspension system can be actuated to perform one or more non-driving functions, including inducing a low frequency rocking motion of the vehicle cabin to induce sleep in one or more occupants, including a child occupant.

As a result, the suspension actuators included in a fully-actuated suspension system of a vehicle can provide haptic feedback to an occupant of the vehicle. Such haptic feedback can leverage a driver's utilization of tactile feedback, also referred to as "touch and feel", as a source of information about the vehicle, road surface, and surrounding environment. Some surfaces, including one or more roadways, can include various devices, including rumble strips, raised lane markers, and speed bumps, which can communicate information to a driver via tactile feedback through the vehicle. Haptic feedback can thus provide an effective and intuitive mechanism for communicating information to a driver, which can result in an improved situational awareness of the driver. Because haptic feedback does not rely on visual cues, haptic feedback can be an effective mechanism for getting a driver's attention, alerting the driver to a hazard that cannot be seen, alerting the driver to a hazard without requiring the driver to divert visual attention, etc.

In some embodiments, the suspension actuators included in a fully-actuated suspension system of a vehicle can provide haptic feedback by simulating the presence of such devices on a surface over which the vehicle is being navigated via actuation of some or all of the suspension actuators included on the vehicle. With fully-actuated suspension, motion of the entire vehicle chassis can be commanded in a high-bandwidth control loop. This mechanism can be used to generate haptic feedback to the driver.

Figure 4:
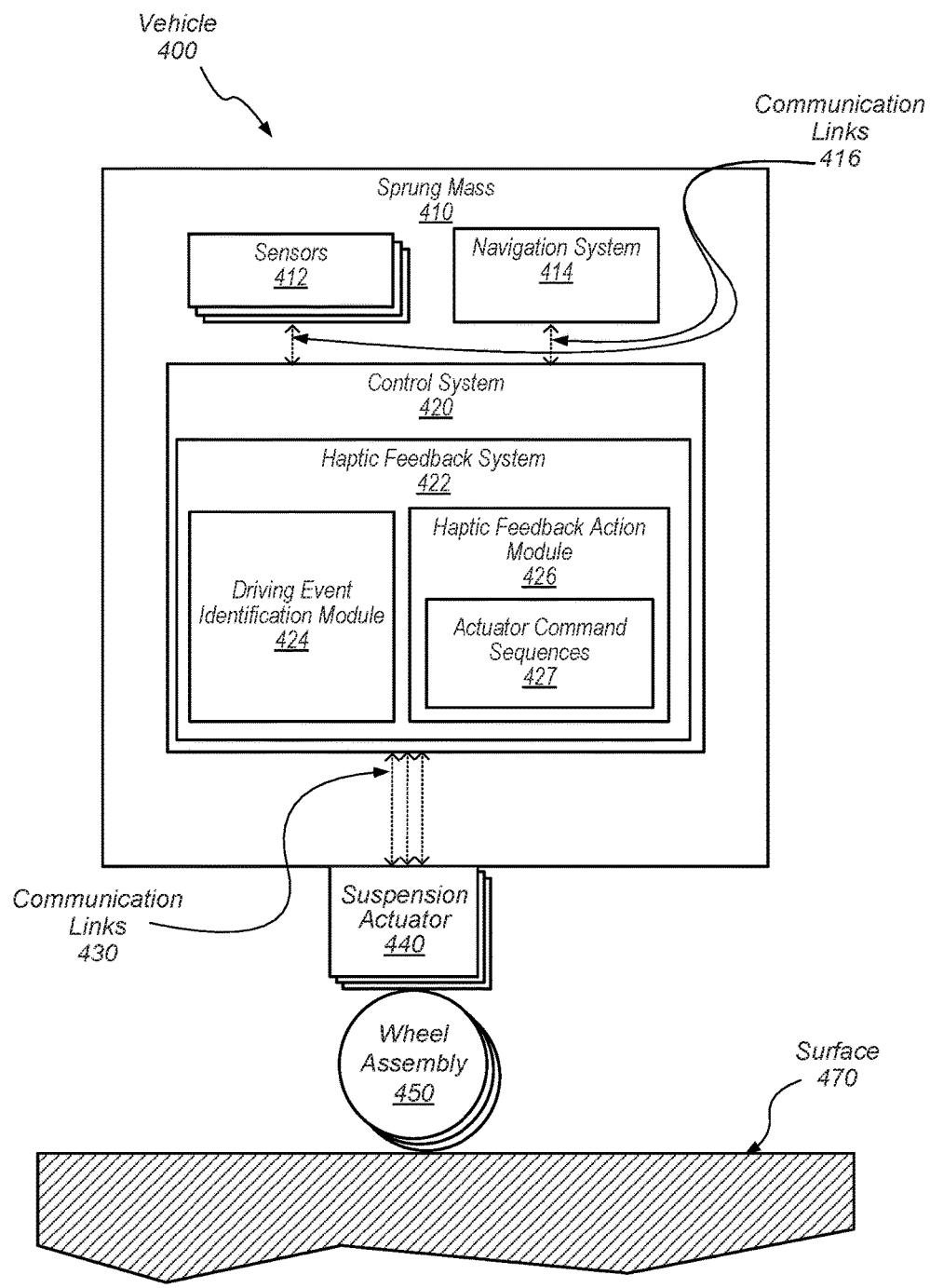
FIG. 4 illustrates a vehicle which includes a fully-actuated suspension system, comprising a control system and a set of suspension actuators coupled to separate wheel assemblies, where the control system is configured to independently control the suspension actuators to at least communicate information to one or more occupants of the vehicle via haptic feedback, according to some embodiments.

FIG. 4 illustrates a vehicle 400 which includes a fully-actuated suspension system, comprising a control system and a set of suspension actuators coupled to separate wheel assemblies, where the control system is configured to independently control the suspension actuators to at least communicate information to one or more occupants of the vehicle 400 via haptic feedback, according to some embodiments. The vehicle shown in FIG. 4 can be included in any of the embodiments included herein.

As shown, vehicle 400 includes a sprung mass 410 in which a set of sensors 412, a navigation system 414, and a control system 420 are located. The vehicle further includes a set of suspension actuators 440 which are coupled to both the sprung mass 410 and separate wheel assemblies 450 which comprise unsprung masses and which are in contact with a surface 470 which can comprise a roadway surface. In some embodiments, one or more of the suspension actuators 440, wheel assemblies 450, etc. include one or more sensors 412, including one or more accelerometers, which are communicatively coupled to the control system 420.

As shown, the control system 420 includes a haptic feedback system which is configured to independently control one or more suspension actuators 440, via one or more communication links 430, based on an identified driving event, where the haptic feedback system 422 controls the suspension positions induced by the various suspension actuators to communicate information regarding the driving event to an occupant of the vehicle 400 via actuation of one or more suspension actuators 440.

Haptic feedback system includes a driving event identification module 424 which is configured to receive and process data from one or more sensors 412, navigation systems, 414, some combination thereof, etc. to determine that one or more particular driving events are presently occurring. A driving event can include an occurrence of one or more events associated with the external environment in which the vehicle 400 is located, an occurrence of one or more events associated with navigation of the vehicle through the external environment, etc. For example, a driving event can include one or more of the vehicle 400 departing from a lane in the roadway along which the vehicle is being navigated; the vehicle transmission state ("gear") being changed to a particular state ("gear"); a detection of one or more traffic participants in the external environment, including oncoming vehicles traveling in a generally opposite direction as the vehicle, detection of pedestrians proximate to the roadway along which the vehicle is being navigated, detection of pedestrians in the roadway along which the vehicle is being navigated, detection of imminent navigation actions (e.g., turns, stops, etc.) by the vehicle to maintain navigation of the vehicle along a driving route, some combination thereof, etc. The module 424 can determine occurrence of the one or more driving events based on processing information from the one or more sensors, navigation system, etc. via one or more communication links 416, 430. In some embodiments, one or more communication links 416 via which information is received includes one or more high-bandwidth communication links.

Haptic feedback system 422 includes a haptic feedback action module 426 which is configured to determine an actuation sequence which is to be implemented by one or more of the suspension actuators 440 to result in communicating information regarding the one or more driving events detected at module 424 to an occupant of the vehicle 400. As shown, the module 426 can include a set of actuator command sequences 427, where each separate command sequence includes a set of command signals which are to be transmitted, in one or more particular sequences, to one or more particular suspension actuators 440 to result in the suspension actuators 440 executing a particular actuation of the vehicle 400 suspension position which results in communicating information regarding a particular driving event. Separate command sequences can be associated with separate driving events, and module 426 can respond to detection, at module 424, of the occurrence of one or more particular driving events by determining one or more particular command sequences 427 which are associated with the detected particular driving events. Module 426 can generate command signals, based on the determined particular command sequences, which can be transmitted to one or more particular suspension actuators 440 to command the actuators 440 to execute the determined particular command sequences.

Haptic feedback can be accomplished via control system 420 transmitting actuator command sequences selected by module 426, based on a determination of an occurrence of one or more particular driving events, to one or more particular suspension actuators 440. An actuator command sequence can include separate command signals which are transmitted to one or more particular components of one or more particular suspension actuators to cause particular independent actuations by particular suspension actuators 440. Such actuations, controlled based on a command sequence, can include synchronized action of a set of actuators 440, including synchronized displacements of one or more components included in the set of actuators, which provides one or more cues, alerts, etc. to a driver of the vehicle, including alerting the driver to departure from the lane in which the vehicle is navigating, alerting the driver to proximate traffic participants (e.g., other vehicles navigating on a common roadway with the vehicle, pedestrians, obstacles in the roadway, etc.).

Such actuation can communicate specific information to the driver, including communicating the specific gear of the vehicle's transmission, communicating a particular navigation actions (e.g., a turn of the vehicle) to continue navigating the vehicle along a driving route selected by the navigation system 414, etc. The commanded motion may coincide with information displayed to the driver. Since each wheel can be independently actuated, haptic feedback can be localized to indicate directionality of some cue. For example, where navigating the vehicle includes executing a rightward turn of the vehicle within a certain period of elapsed time, certain distance of travel, etc., the resulting command sequence 427 selected by module 426 can include actuation of the front-right suspension actuator coupled to the front-right wheel, thereby communicating the imminent rightward turn to the driver.

The control system 420 can command, via one or more actuator command sequences 427, one or more particular actuations by one or more suspension actuators. Actuations by a suspension actuator can include one or more particular displacement motions of one or more particular actuators, including a discrete push motion, a discrete pull motion, oscillatory motion, some combination thereof, etc. In some embodiments, the control system 420 commands one or more suspension actuators 440 to execute actuations which result in oscillatory displacement motion of the actuators which induces vibration motion of one or more portions of the vehicle 400.

Induced vibration motion by one or more actuators can simulate the haptic feedback communicated as a result of the vehicle driving over one or more devices installed in a roadway surface, including rumble strips. The control system 420, in some embodiments, can command one or more suspension actuators, based on commands received from one or more separate control systems within the vehicle 400, including the navigation system 414. The navigation system 414 can include an autonomous navigation system, an active safety system, etc. In some embodiments, one or more received commands are identified by module 424 as one or more particular driving events, such that one or more actuator command sequences are associated with a particular command received from one or more separate control systems.

Control system 420 can control actuators 440 to provide haptic feedback, via execution of various actuator command sequences, in various applications. In some embodiments, control system 420 can identify a driving event occurrence associated with a forward driving gear of the transmission of the vehicle being engaged by selecting and executing a particular actuator command sequence which causes the actuators 440 coupled to one or more of the wheels of the vehicle to actuate in a particular displacement motion of the actuators which results in a forward pitch, reverse pitch, some combination thereof, etc. of the vehicle, thereby communicating that the vehicle is in the forward driving gear. In some embodiments, control system can identify a driving event occurrence associated with a reverse driving gear of the transmission being engaged by selecting and executing a particular actuator command sequence which causes the actuators 440 coupled to one or more of the wheels of the vehicle to actuate in a particular motion which results in a forward pitch, reverse pitch, some combination thereof, etc. of the vehicle, thereby communicating that the vehicle is in the reverse driving gear. In some embodiments, control system can identify a driving event occurrence associated with a parking driving gear of the transmission being engaged by selecting and executing a particular actuator command sequence which causes the actuators 440 coupled to one or more of the wheels of the vehicle to actuate in a particular displacement motion which results in the ride height of the vehicle being at least temporarily reduced, thereby communicating that the vehicle is in the parking driving gear.

In some embodiments, control system 420 can identify a driving event occurrence associated with a departure of the vehicle from a particular lane of a roadway, departure from a particular range of driving speeds, etc. by selecting and executing a particular actuator command sequence which causes the actuators 440 coupled to one or more of the wheels of the vehicle to actuate in an oscillating "vibrating" motion which results in a vibration being transmitted through the vehicle thereby communicating that the vehicle has departed from a particular lane of a roadway, has departed from a particular range of driving speeds, etc. Oscillation motions can be executed via high-frequency actuation of at least some portion of at least one suspension actuator. Such oscillation motions can be executed by one or more suspension actuators located proximate to a particular end of the vehicle to communicate, in addition to the general nature of the driving event (lane departure, speed departure etc.), a general directional cue associated with the driving event (e.g., vibration motion by actuators proximate to the left side of the vehicle communicates that the vehicle is departing the roadway lane to the left).

In some embodiments, an actuator command sequence which causes an oscillation displacement motion of a suspension actuator causes the actuator to execute an individual oscillation displacement motion. Such an oscillation motion of the actuator can be referred to interchangeably herein as a "tapping" of the actuator, "pulsing" of the actuator", "thumping" of the actuator, etc. In some embodiments, an actuator command sequence causes the actuator to execute individual "thumping" displacement motions at a particular set of time intervals, also referred to as "thumping" the actuator at a particular repetitive frequency.

In some embodiments, control system 420 can identify a driving event occurrence associated with an upcoming turn along a driving route selected by a navigation system of the vehicle by selecting and executing a particular actuator command sequence which causes the actuators 440 coupled to one or more of the wheels of the vehicle to actuate in a displacement motion which results in a portion of the vehicle proximate to the direction of the turn being displaced in suspension position, thereby communicating that the vehicle is to be turned in the particular direction. The displacement of one or more particular portions of the vehicle can result in inducing a rolling action of the vehicle in a direction which is associated with the direction of the turn.

In some embodiments, control system 420 can identify a driving event occurrence associated with a detection of an object in a blind spot of a driver of the vehicle by selecting and executing a particular actuator command sequence which causes the actuators 440 coupled to one or more of the wheels of the vehicle to actuate in an oscillating "vibrating" displacement motion which results in a vibration being transmitted through the vehicle thereby communicating, to the driver, that an object is located in the driver's blind spot.

Oscillation displacement motions can be executed via low-frequency actuation of at least some portion of at least one suspension actuator. Such oscillation displacement motions can be executed by one or more suspension actuators located proximate to a particular end of the vehicle to communicate, in addition to the general nature of the driving event (lane departure, speed departure etc.), a general directional cue associated with the driving event (e.g., vibration displacement motion by actuators proximate to the left side of the vehicle communicates that the vehicle is departing the roadway lane to the left). In some embodiments, an actuator command sequence which causes oscillation displacement motion of a suspension actuator causes the actuator to execute an individual "thumping" displacement motion.

In some embodiments, control system 420 can identify a driving event occurrence associated with a determination that the vehicle is transitioning between manual driving control and autonomous driving control by selecting and executing a particular actuator command sequence which causes the actuators 440 coupled to one or more of the wheels of the vehicle to actuate in a displacement motion which results in communicating, to the driver, that the vehicle is transitioning between manual and autonomous driving control.

Figure 5:
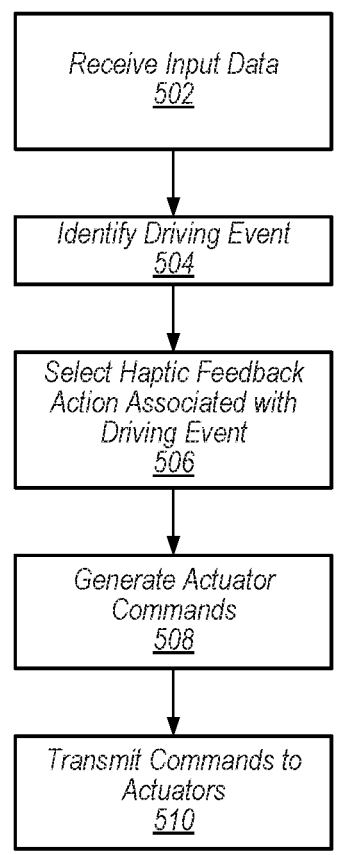
FIG. 5 illustrates controlling one or more sets of suspension actuators in a vehicle to provide haptic feedback to a driver of the vehicle, according to some embodiments.

FIG. 5 illustrates controlling one or more sets of suspension actuators in a vehicle to provide haptic feedback to a driver of the vehicle, according to some embodiments. The control can be implemented by any of the embodiments of control systems, control units, etc. included herein. A control system, control unit, etc. can be implemented by one or more computer systems. Such controlling can include communicating information regarding one or more aspects of the vehicle, an external environment through which the vehicle is being navigated, one or more traffic participants located in the external environment, some combination thereof, etc.

At 502, input data is received from one or more data sources, also referred to herein as information sources. Such sources can include one or more sensor devices, control systems, navigation systems, etc. For example, input data can include sensor data generated by one or more external sensors of the vehicle, including one or more camera images of at least a portion of the external environment being navigated by the vehicle.

At 504, a driving event is identified as occurring based on processing at least some of the received input data. For example, based on processing image data received from one or more external sensor devices, the vehicle can be determined to be departing from a driving lane in the roadway along which the vehicle is being navigated, and such departure can be identified as a particular driving event, such that the particular driving event is identified as presently occurring.

As 506, a particular haptic feedback action associated with the driving event is selected. A particular haptic feedback action can include execution of one or more sets of selected actuator command sequences by one or more particular suspension actuators included in the vehicle, such that the selection at 506 includes identifying and selecting a particular set of actuator command sequences which are associated with the one or more driving events identified at 504.

At 508, one or more command signals which cause one or more particular suspension actuators to execute one or more particular actuations are generated, based on the selected actuator command sequences; at 510, the generated commands are transmitted to the one or more particular suspension actuators. The command signals can include signals to be transmitted to multiple suspension actuators which cause the actuators to execute synchronized actuations. The command signals can include independent signals associated with separate particular suspension actuators which cause the separate actuators to execute independent actuations. Command signals can include signals which cause separate components of an actuator to execute separate actuations. In some embodiments, a command signal causes an actuator to execute a sequence of actuations, including a continuous vibration displacement motion, for at least a certain period of elapsed time.

Actuator Braking

In some embodiments, a fully-actuated suspension system included in a vehicle provides augmented braking of the vehicle, based on a braking command signal received from one or more control systems, based on executing "thumping" actuations of one or more suspension actuator. Thumping of a suspension actuator, which includes increasing the displacement of the actuator from the neutral suspension position in a direction towards the sprung mass, at a frequency which is higher than the primary ride frequency of the vehicle, can result in, for the duration of the "thumping" of the actuator, increased normal force exerted by the actuator on the unsprung mass, which can result in increased contact area of a wheel included in the unsprung mass on a surface upon which the wheel, and thus the vehicle, rests. Such increased normal force and increased contact area can result in augmented braking of the vehicle, which can result in reduced distance requirements, time requirements, associated with braking of the vehicle.

In some embodiments, the augmented braking provided by the fully-actuated suspension system is provided in place of an anti-lock braking system, in concert with braking pressure variation executed by an anti-lock braking system, some combination thereof, etc. "Thumping" of a suspension actuator can include increasing the displacement of the actuator at a frequency which is higher than the primary ride frequency of the vehicle. Thumping one or more actuators can result in augmented unloading of torsion induced in the one or more wheels by one or more braking systems over a reduced amount of distance of travel of the vehicle, relative to the unloading of torsion resulting from variation of braking pressure executed by an anti-lock braking system. Such augmented unloading of torsion can result in reduced braking distance of the vehicle, relative to braking as a result of an anti-lock braking system alone.

In some embodiments, thumping one or more suspension actuators based on braking of the vehicle results in a reduction of a braking distance of the vehicle, relative to a braking distance when braking of the vehicle is applied without thumping the suspension actuators. Braking distance can include stopping distance, and reducing the braking distance, stopping distance, etc. of a vehicle can augment occupant safety provided by the vehicle. For example, where the vehicle encounters adverse weather which results in a presence of surface lubricants (standing water, snow, ice, etc.) on a roadway surface, the road/wheel coefficient of friction for the wheels of the vehicle can be reduced.

Thumping an actuator in concert with applying braking pressure during braking of a vehicle can result in a reduced braking distance, relative to applying braking pressure without the pulsing, as the actuator displacement can be executed independently of braking pressure, thereby enabling torsion unloading of a wheel of the vehicle without reducing braking pressure, which could result in extending braking distance, and the actuator displacement can augment the contact area of the vehicle wheel with the surface, which can mitigate the effects of surface lubricants on the coefficient of friction of the wheel with the surface, for example during hydroplaning, driving on icy road surfaces, etc.

In some embodiments, a fully-actuated suspension system uses actuated suspension to reduce braking distance of a vehicle during emergency maneuvers, braking maneuvers, etc., based at least in part upon generation of a vehicle braking command by one or more interfaces, control systems, etc. of the vehicle, which can result in the application of braking pressure on one or more wheels of the vehicle by a braking system. In some embodiments, the fully-actuated suspension system includes a control system which commands one or more suspension actuators included in the vehicle to execute displacement motions which displace the unsprung mass towards the surface upon which the unsprung mass lies in a stuttered, high-frequency sequence. Such a sequence of positive displacement of one or more actuators can include "thumping" one or more of the actuators. Thumping suspension actuators coupled to one or more wheels, based on a braking command, can result in temporarily loading the one or more wheels and actuators for increased contact area and increased normal force, both of which can result in an increase in the coefficient of friction at the roadway surface/wheel interface. When the actuator retracts in displacement towards the neutral suspension position between "thumps," torsion in the wheel that has been loaded by the braking pressure applied to the wheel can be released as a result. Such "torsion unloading" can result in preventing wheel lock and enabling the wheel to undergo further torsion during the subsequent "thump" (positive displacement of the actuator).

In some embodiments, "thumping" of one or more actuators can be implemented in place of various braking systems, in conjunction with of various braking systems, etc. Such various braking systems can include one or more of anti-lock braking systems (ABS), electronic stability control (ESC), etc. In an example, the thumping motion of the suspension actuators can be synchronized with the throttling of braking pressure via ABS, which can result in the maximum braking pressure being applied while the actuators are displacing the unsprung mass into the roadway surface and the braking pressure is reduced when the actuators are releasing the displacement.

In some embodiments, the suspension actuators can be controlled to displace lubricants on the road surface via the above-described "thumping" of one or more actuators. Such thumping can be based on various sensor data indicating the presence of surface lubricants, including sensor data indicating wheel slippage. Such thumping can be executed independently of braking pressure. Hazards such as standing water and ice can reduce friction (and increase stopping distance) by preventing direct contact of the wheel with the roadway surface. Based on using the suspension actuators to temporarily increase the normal force at one or more wheels via the above-described "thumping" action, these low frequency hazards can be overcome by displacing the fluid or compressing the ice to temporarily make direct contact with the road surface. By "thumping" the front and rear actuators at one or more repetition frequencies, stopping distance can be reduced in adverse weather conditions. The particular repetition frequency at which one or more actuators are "thumped" can be determined based at least in part upon one or more determinations, including a determination of the vehicle velocity, a determination of the type of surface lubricant, etc.

In some embodiments, the "thumping" of one or more actuators can be established as a sequence or "profile" of actuations by the one or more actuators. Such a profile can be adjusted, based on adjustable acceleration of the actuator during thumping, jerk of the actuator during thumping, repetition frequency of the thumps of the actuator during thumping, etc. An actuation profile can be adjusted based on various platform-dependent parameters, including the vehicle mass, suspension stiffness, wheel assembly stiffness, tire stiffness, wheel assembly mass, etc. An optimum actuation profile, which can include an actuation profile for an actuation thumping sequence under a certain set of environmental conditions which results in a minimum braking distance of the vehicle, can be determined experimentally based on data generated during braking maneuvers in a variety of environmental conditions. Once an optimal actuation profile is determined, the parameters are implemented into the control system. The parameters may also be optimized on-the-fly by incorporating additional sensor data, such as wheel slip sensor data, road surface condition monitoring systems, yaw rate sensors, three-axis accelerometers, etc.

Figure 6:
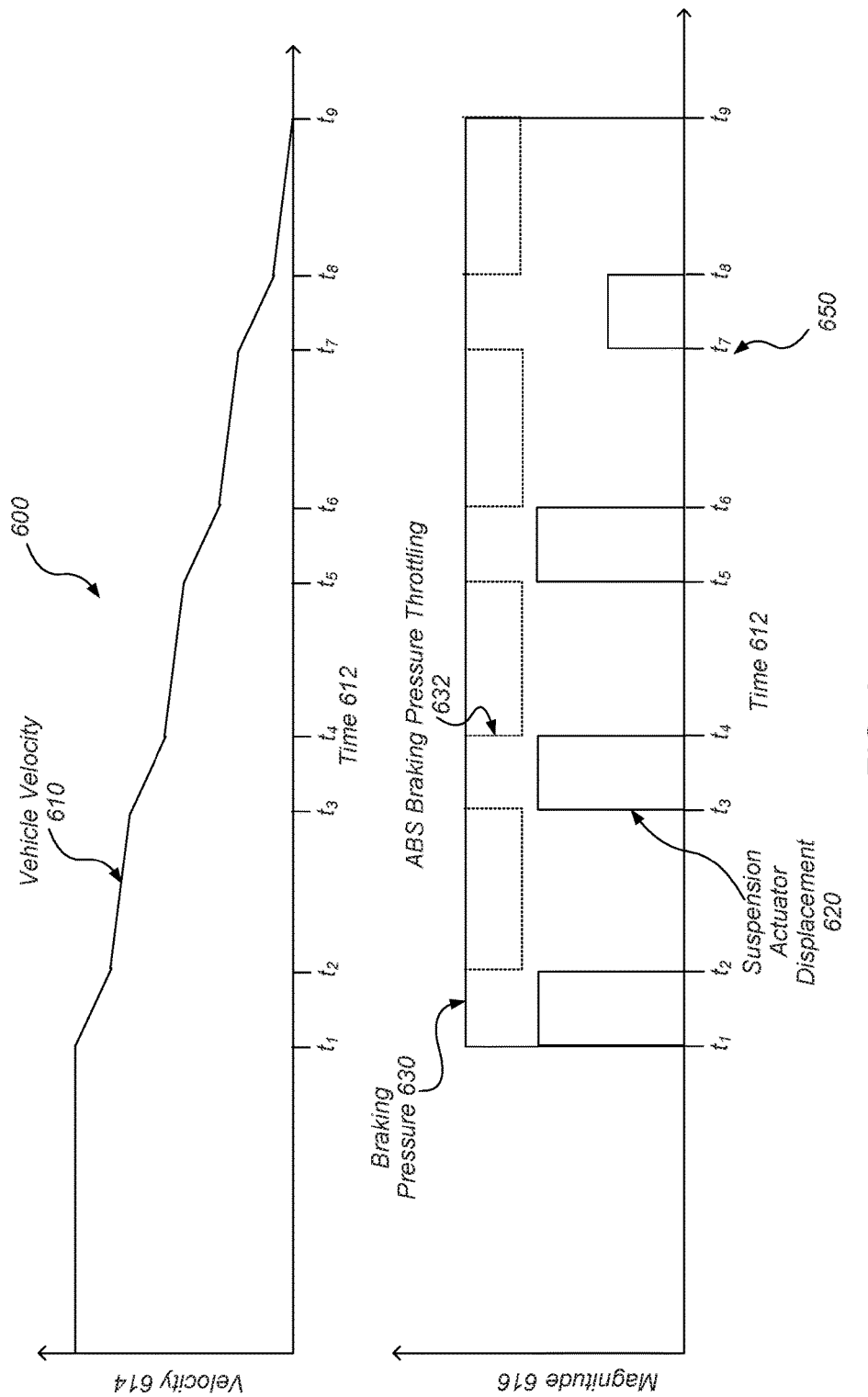
FIG. 6 illustrates a graphical representation of vehicle velocity, actuator displacement, and applied braking pressure over time where a fully-actuated suspension system is used to augment braking of a vehicle provided by a braking system, according to some embodiments.

FIG. 6 illustrates a graphical representation of vehicle velocity, actuator displacement, and applied braking pressure over time where a fully-actuated suspension system is used to augment braking of a vehicle provided by a braking system, according to some embodiments. The actuator displacement can be executed by any of the actuators in any of the embodiments included herein and can be controlled by any of the control systems, control units, etc. included in any of the embodiments herein.

FIG. 6 shows a first graphical representation 600 of the velocity profile of a vehicle as a function of vehicle velocity 614 over elapsed time 612. FIG. 6 further shows a graphical representation 650 of a magnitude of suspension actuator displacement 620 and applied braking pressure 630 on one or more wheels of the vehicle over time 612. The illustrated changes in applied braking pressure 630 and suspension actuator displacement 620 are illustrated in FIG. 6 as being approximately instantaneous at particular points in time; it will be understood that both changes in applied braking pressure and suspension actuator displacement can be non-instantaneous and occur over a period of elapsed time, such that a change in one or more of braking pressure, suspension actuator displacement, etc. at a particular period of time can include a non-instantaneous change in magnitude 616 of the one or more of applied braking pressure 630, suspension actuator displacement 620, etc. over a period of elapsed time 612 which includes the particular period of time.

In some embodiments, a particular rate of change in magnitude of one or more of applied braking pressure, suspension actuator displacement, etc. is greater in one direction than a change in magnitude in another direction. For example, an increase in magnitude of applied braking pressure 630 to a particular magnitude 616 at a particular point in time 612 can be non-instantaneous, such that the applied braking pressure increases to the particular magnitude 616 over a period of elapsed time following the particular point in time, while a decrease in magnitude of applied braking pressure 630 to another particular magnitude, which can include an absence of braking pressure, at another particular point in time 612 can occur over a second period of elapsed time, following the other particular point in time, which is less than the first period of elapsed time. In some embodiments, a change in magnitude of one or more of applied braking pressure, suspension actuator displacement, etc. in one direction can be non-instantaneous while a change in magnitude of the one or more of applied braking pressure, suspension actuator displacement, etc. in another direction can be instantaneous or near-instantaneous, such that an illustration of an increase and decrease in the magnitude 616 of the one or more of applied braking pressure, suspension actuator displacement, etc. over time 612 in the representation 650 can resemble a "sawtooth" wave profile.

As shown, when braking pressure is applied to a wheel of the vehicle at time "$t_1$", a suspension actuator is caused to temporarily displace 620 in a sequence of displacement "pulses" which are also referred to herein as "thumping" the actuator. Each displacement, or "thump" of the actuator, can last for a period of time which is less than the primary ride frequency, resulting in minimal elevation of the sprung mass away from the surface upon which the unsprung mass, and thus the vehicle, rests. As shown, the first "thump" of the actuator includes displacing the actuator during the time period "$t_1$-$t_2$", the next "thump" of the actuator includes displacing the actuator during the time period "$t_3$-$t_4$", etc. As shown with regard to the "thump" of the actuator during the time period "$t_7$-$t_8$", the magnitude of the displacement of the actuator can be adjusted, for each "thump", based at least in part upon the velocity of the vehicle.

As shown, the "thumping" of the suspension actuator via the shown actuator displacement thumps 620 in FIG. 6 can be implemented concurrently with applied braking pressure. Each "thump" can result in unloading the torsion of the wheel which can result at least in part from the application of braking pressure, thereby providing the torsion unloading provided by an ABS braking system without requiring relaxation of braking pressure to relieve torsion. Because braking pressure 630 can remain constant while the thumping sequence 620 is executed, a braking distance of the vehicle can be reduced, relative to applying braking pressure with ABS braking pressure throttling 632 in the absence of suspension actuator thumping 620.

In some embodiments, actuator thumping and ABS braking pressure throttling can be executed in combination. The actuator thumping can be synchronized with maximum braking pressure during the ABS throttling process, so that maximum normal force is applied to the unsprung mass when maximum braking pressure is applied, which can result in reduced stopping distance by augmenting wheel/surface contact area and coefficient of friction concurrently with providing greater braking pressure. For example, as shown in FIG. 6, actuator thumping 620 can be synchronized to occur between ABS braking pressure throttling 632.

Figure 7:
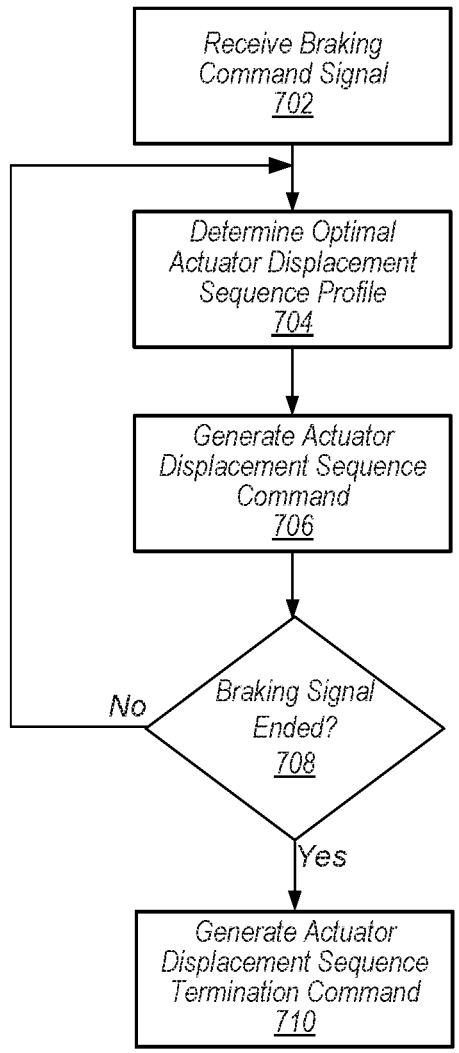
FIG. 7 illustrates controlling one or more sets of suspension actuators in a vehicle to execute a sequence of displacements of the unsprung mass based on a braking maneuver being executed by the vehicle, according to some embodiments.

FIG. 7 illustrates controlling one or more sets of suspension actuators in a vehicle to execute a sequence of displacements of the unsprung mass based on a braking maneuver being executed by the vehicle, according to some embodiments. The control can be implemented by any of the embodiments of control systems, control units, etc. included herein. A control system, control unit, etc. can be implemented by one or more computer systems.

At 702, a braking command signal is received. The braking command signal can be generated by one or more user interfaces included in the vehicle, including a brake control interface, brake pedal interface, etc. The braking command signal can be generated by one or more control systems, included in the vehicle, which are at least partially controlling driving of the vehicle, including an autonomous navigation system which is controlling one or more of the control elements of the vehicle via autonomous driving control of the vehicle. The braking command signal can include a command signal which indicates that a command is being generated to cause one or more braking control elements in the vehicle to apply braking pressure to one or more wheel assemblies included in the vehicle. The braking command signal can be received continuously for the duration that braking is commanded by one or more user interfaces, control systems, some combination thereof, etc. independently of the magnitude of braking pressure which is commanded to be applied by one or more braking control elements of the vehicle.

At 704, an actuator displacement sequence profile is determined for a displacement sequence to be executed by one or more suspension actuators included in the vehicle. The displacement sequence profile can include repetition frequency of actuator displacements, magnitude of displacement, acceleration of displacement, jerk of displacement duration of one or more displacements, etc.

At 706, one or more command signals which, when executed by one or more actuators, cause the one or more actuators to displace at least one unsprung mass according to the determined actuator displacement sequence profile, are generated. Separate sets of command signals can be generated for transmission to separate sets of actuators, based on the determined actuator displacement sequence profile. For example, where a determined profile includes a different magnitude of displacement by one set of actuators in the vehicle relative to another set of actuators, separate sets of command signals can be generated for transmission to the separate sets of actuators which cause the separate sets of actuators to execute the different magnitudes of displacement.

At 708, a determination is made regarding whether the braking command signal has ceased to be received. If not, the process at 704-706 repeats, which can include revising the actuator displacement sequence profile at 704 and generating a new set of commands to the actuators based on the revised profile at 706. If so, at 710, a command is generated which causes the actuators to cease execution of the displacement sequence.

Motion Compensation

In some embodiments, a fully-actuated suspension system included in a vehicle provides augmented compensation of low-frequency motion of the vehicle, where low-frequency motion of the vehicle includes motion which has a frequency of less than 1 hertz, a frequency which is less than that of the primary ride frequency, some combination thereof, etc. The compensation can include detecting, at a control system based on sensor data, the presence of such low-frequency motion and commanding one or more sets of suspension actuators in the vehicle to execute an actuation sequence which compensates for at least the detected low-frequency motion. Such low-frequency motion compensation can mitigate the risk of motion sickness by occupants of the vehicles.

In some embodiments, motion sickness of an occupant of a vehicle can be at least partially induced as a result of vertical oscillatory motion of the vehicle which has a frequency which is less than 1 Hz, with peak sensitivity occurring between 0.1-0.2 Hz. Based at least in part upon a fully-actuated suspension system including one or more sets of high-bandwidth sensors, the suspension system can detect such low-frequency motion and command one or more sets of suspension actuators to execute motions which attenuate the low-frequency motion, thereby improving occupant comfort, mitigating a risk of occupant motion sickness, etc.

As referred to herein, the primary ride frequency refers to the natural resonant frequency of passenger vehicle suspension systems. Such a primary ride frequency can be between 1.0-2.0 Hz, based at least in part upon the vehicle mass, suspension system stiffness, some combination thereof, etc. In some embodiments, a fully-actuated suspension system is configured to attenuate vehicle motion throughout a range of frequencies which includes frequencies which are less than the primary ride frequency and which are greater than the primary ride frequency, thereby providing augmented oscillation attenuation relative to passive suspension systems which are configured to attenuate unsprung mass motion which is approximately at the primary ride frequency and are not configured to attenuate low-frequency oscillations.

In some embodiments, a fully-actuated suspension systems includes one or more sets of sensor devices, including one or more sets of accelerometers, which are configured to detect oscillations having a frequency which is substantially less than the primary ride frequency, including oscillations having a frequency of less than 0.5 Hz, 0.2 Hz, 0.1 Hz, some combination hereof, etc. An accelerometer, as described herein, can be configured to measure the vertical acceleration of the mass to which the accelerometer is coupled. For example, an accelerometer coupled to an unsprung mass can measure the vertical acceleration of the unsprung mass. The suspension system can include a control system which can process sensor data received from the sensors, determine the presence of a low-frequency oscillation of the unsprung mass based on processing the sensor data, and generate one or more command signals which include a command signal to a control elements which controls the variable pressure air spring, where the command signal causes the control element to cause the air spring to expand and contract in a motion which at least partially attenuates the detected low-frequency oscillation. Such a control element can include an air compressor. Each actuator is commanded by an electronic control unit (ECU). The control system can take input from accelerometers with high sensitivity below 0.1 Hz. A feedback loop compensates the acceleration measured by the accelerometer by commanding push/pull of the actuator. Low-frequency motion that would otherwise be transmitted to the cabin is thus attenuated by actuating the damper to counter the motion of the unsprung mass.

Figure 8:
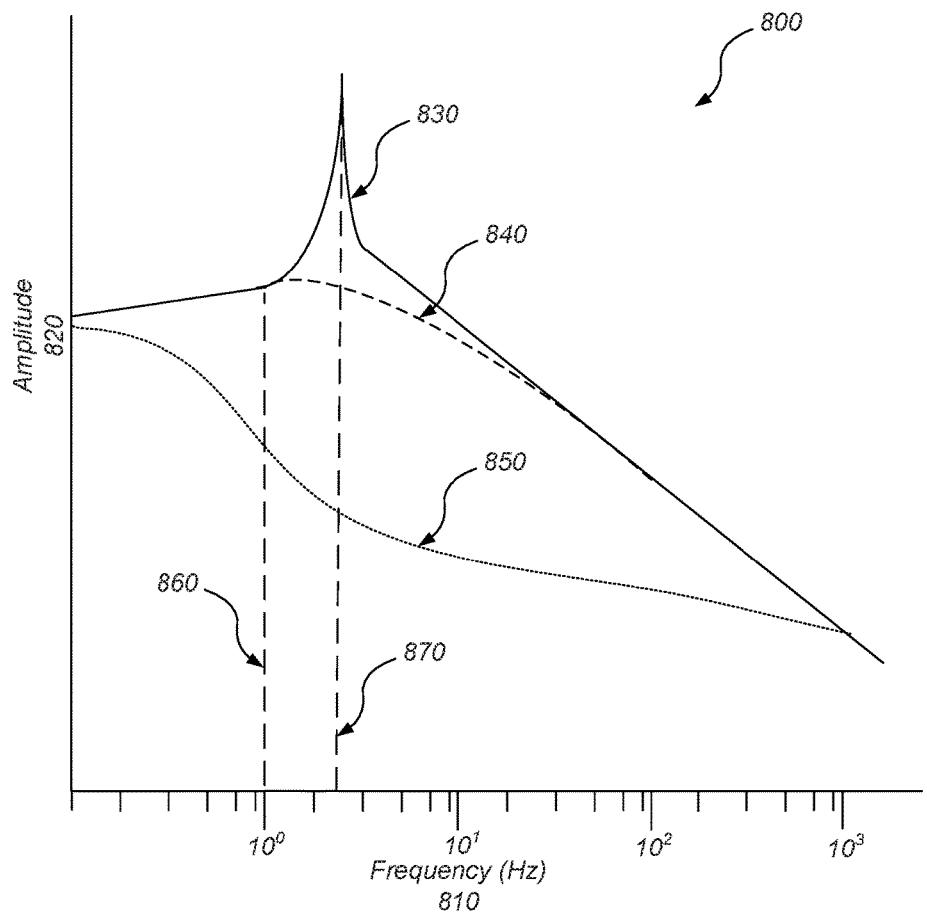
FIG. 8 illustrates a graphical representation of the amplitude of oscillations of a sprung mass by a fully-actuated suspension system across a range of oscillation frequencies, according to some embodiments.

FIG. 8 illustrates a graphical representation 800 of the amplitude 820 of oscillations of a sprung mass by a fully-actuated suspension system across a range of oscillation frequencies 810, according to some embodiments. As shown, curve 830 illustrates oscillations by a sprung mass which are not attenuated by any suspension system. As shown, the amplitude 820 of the un-damped sprung mass peaks at the primary ride frequency 870, which is approximately between 2-3 Hz. FIG. 8 further illustrates a curve 840 which illustrates oscillations by a sprung mass which is coupled to a passive suspension system configured to attenuate the primary ride frequency. As shown, the amplitude of oscillations at the primary ride frequency 870 are attenuated by the passive suspension system 840, but oscillations below a threshold frequency 860 of approximately 1 Hz are not attenuated.

FIG. 8 shows a curve 850 which illustrates oscillations by a sprung mass which is coupled to a fully-actuated suspension system which is configured to detect and attenuate oscillations across a range of frequencies which extend above and below the threshold frequency 860. As shown, the curve 850 illustrates attenuation by a fully-actuated suspension system of oscillations at any frequency beneath the threshold frequency 860 of the passive suspension system. As a result, a fully-actuated suspension system can attenuate both low-frequency oscillations and high-frequency oscillations, thereby mitigating a risk of oscillation-induced motion sickness by one or more occupants of the vehicle.

In some embodiments, where a fully-actuated suspension system includes a variable pressure air spring and a hydraulically-driven piston system, the air spring can be controlled to attenuate low-frequency oscillations, thereby providing energy savings relative to suspension systems which use hydraulic systems, EM systems, etc. to compensate low-frequency oscillations, as operation of the air spring to attenuate low-frequency motion, while concurrently operating a hydraulic system to attenuate high-frequency motion, can require less electrical power than operation of hydraulic systems, EM actuators, etc. to attenuate both the low-frequency motion and the high-frequency motion.

Example Computer System

Figure 9:
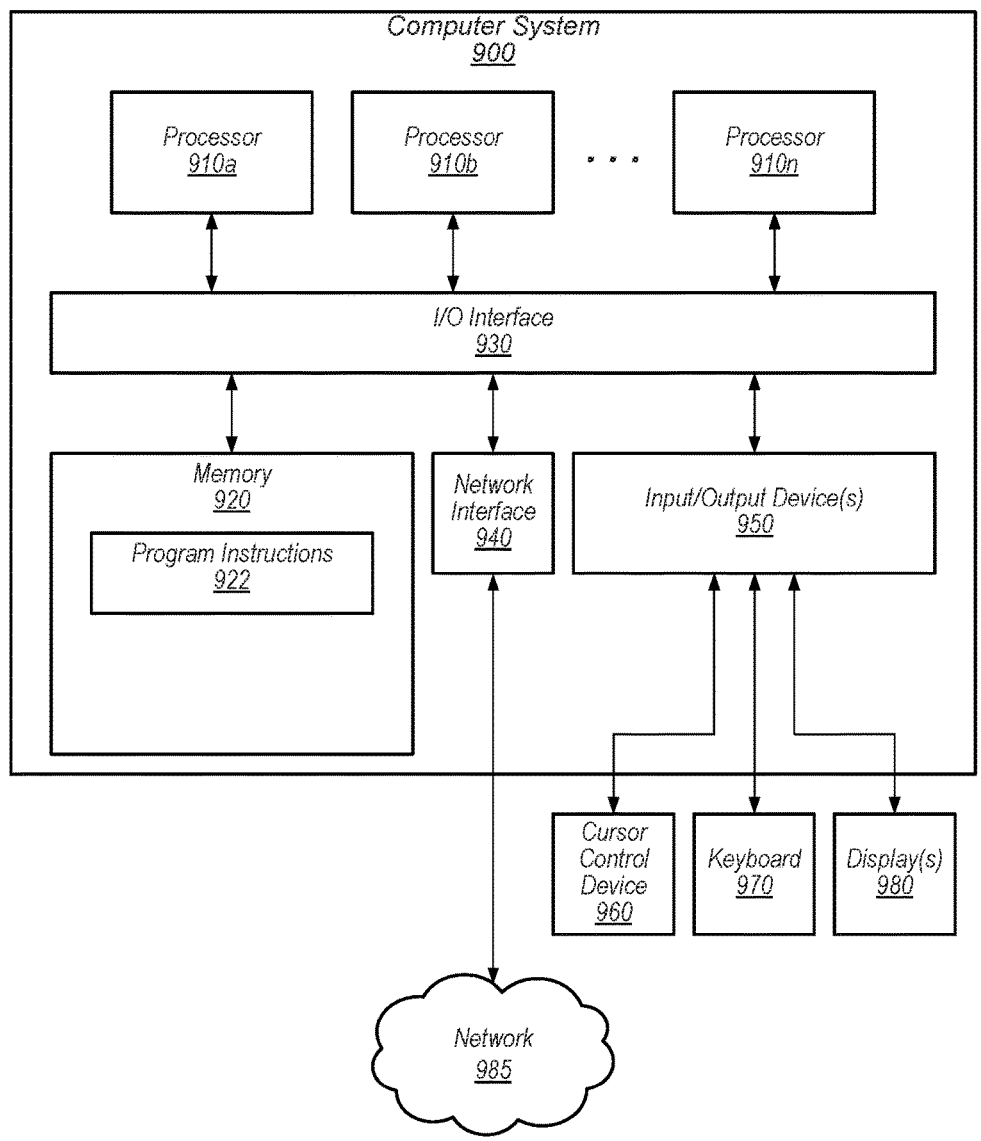
FIG. 9 illustrates an example computer system that may be configured to include or execute any or all of the embodiments described above.

FIG. 9 illustrates an example computer system 900 that may be configured to include or execute any or all of the embodiments described above. In different embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a control system, control unit, some combination thereof, etc. included in a fully-actuated suspension system, as described herein, may be executed in one or more computer systems 900, which may interact with various other devices. Note that any component, action, or functionality described above with respect to FIGS. 1 through 8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices, which can include one or more user interface devices. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 925, data 926, etc. accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 920 may be configured to implement some or all of an automotive climate control system incorporating any of the functionality described above. Additionally, existing automotive component control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network 950 (e.g., carrier or agent devices) or between nodes of computer system 900. Network 950 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A fully-actuated suspension system, comprising:
at least one suspension actuator, coupled to a sprung mass and an unsprung mass, which comprises:
   a variable pressure air spring configured to adjust a neutral suspension position of the sprung mass over the unsprung mass based at least in part on displacement of the variable pressure air spring, wherein adjusting the neutral suspension position of the sprung mass is based at least in part on a particular set of command signals received from a control system, and wherein the variable pressure air spring is configured to attenuate low frequency variations of a height of the sprung mass; and
   a hydraulically-driven piston assembly configured to be actuated to cause a displacement motion of the actuator from the neutral suspension position, such that the sprung mass is displaced from the adjusted neutral suspension position, based on a separate set of command signals received from the control system, wherein the hydraulically-driven piston is configured to attenuate high frequency variations of the height of the sprung mass,
   wherein the neutral suspension position is determined based on minimizing the displacement motion of the actuator by the hydraulically-driven piston to attenuate the high frequency variations.

2. The fully-actuated suspension system of claim 1, further comprising:
an air compressor configured to provide pressurized air to the variable pressure air spring.

3. The fully-actuated suspension system of claim 2, further comprising:
an air conduit coupled to the air compressor and the variable pressure air spring, the air conduit comprising a high pressure line configured to transfer the pressurized air from the air compressor to the variable pressure air spring.

4. The fully-actuated suspension system of claim 3, wherein the air conduit further comprises one or more actuated valves configured to maintain the pressurized air in the variable pressure air spring to maintain a particular position of the hydraulically-driven piston by isolating the pressurized air into the variable pressure air spring.

5. The fully-actuated suspension system of claim 1, further comprising:
a pump configured to move hydraulic fluid between an inner chamber and an outer chamber of the hydraulically-driven piston based on the separate set of command signals received from the control system.

6. The fully-actuated suspension system of claim 1, further comprising:

at least one sensor configured to generate sensor data based on a road condition, wherein the control system is configured to generate command signals based on the sensor data.

7. The fully-actuated suspension system of claim 6, wherein the at least one sensor comprises:
a first accelerometer coupled to the unsprung mass, wherein the first accelerometer is configured to generate first acceleration data based on oscillation of the unsprung mass; and
a second accelerometer coupled to the sprung mass, wherein the accelerometer is configured to generate second acceleration data based on oscillation of the sprung mass.

8. The fully-actuated suspension system of claim 7, wherein the control system is further configured to determine relative oscillation of the sprung mass with respect to the unsprung mass based on the first acceleration data and the second acceleration data.

9. A system, comprising
a fully-actuated suspension system, configured to be installed in a vehicle, which comprises:
at least one suspension actuator, coupled to a sprung mass and an unsprung mass; and
a control system configured to command the at least one suspension actuator to provide haptic feedback to at least one occupant of the vehicle comprising executing a particular actuation, wherein the particular actuation causes a displacement motion of the at least one suspension actuator that communicates information to the at least one occupant of the vehicle via the haptic feedback.

10. The system of claim 9, further comprising:
at least one sensor configured to generate sensor data based on a driving event, wherein the control system further comprises a driving event identification module configured to analyze the sensor data to determine that the driving event is occurring.

11. The system of claim 10, wherein the at least one sensor comprises a location sensor configured to determine a current location of the vehicle, and wherein the driving event includes an upcoming road hazard based on the current location.

12. The system of claim 10, wherein the at least one sensor comprises a proximity sensor configured to detect a nearby object, and wherein the driving event includes the nearby object being detected in a blind spot of the vehicle.

13. The system of claim 9, wherein the control system comprises an action module configured to determine an actuation sequence to be implemented by the at least one suspension actuator.

14. The system of claim 13, wherein the actuation sequence comprises a set of command signals that command the at least one suspension actuator to execute the particular actuation.

15. The system of claim 9, wherein the particular actuation includes synchronized displacements of one or more components included in the at least one suspension actuator, and wherein the particular actuation includes a discrete push motion, a discrete pull motion, an oscillatory motion, or any combination thereof.

16. A system, comprising:
a fully-actuated suspension system, configured to be installed in a vehicle which comprises a braking system, which comprises:
at least one suspension actuator, coupled to a sprung mass and an unsprung mass, wherein the unsprung mass comprises a wheel assembly coupled to the braking system; and
a control system configured to command the at least one suspension actuator to execute a particular actuation, such that a displacement motion caused by the actuation of the at least one suspension actuator causes the wheel assembly to be displaced towards a surface upon which the wheel assembly is located, based on generation of a braking command to the braking system to exert at least some braking pressure on the wheel assembly, wherein the particular actuation comprises a sequence of displacement pulses, wherein the sequence of displacement pulses is synchronized with throttling of the braking pressure exerted by the braking system.

17. The system of claim 16, wherein the particular actuation includes increasing displacement of the at least one suspension actuator at a frequency that is higher than a primary ride frequency of the vehicle.

18. The system of claim 17, wherein a particular displacement pulse is executed in a period of time that is less than the primary ride frequency.

19. The system of claim 16, wherein the control system is further configured to store the particular actuation to a profile, wherein the profile is adjustable based on acceleration of the at least one suspension actuator during the particular actuation.

20. The system of claim 19, wherein the control system is further configured to optimize the profile based on braking distance of the vehicle.

* * * * *